L. F. KLOEHN.
PORTABLE DERRICK.
APPLICATION FILED NOV. 15, 1920.
1,402,074.
Patented Jan. 3, 1922.
2 SHEETS—SHEET 1.
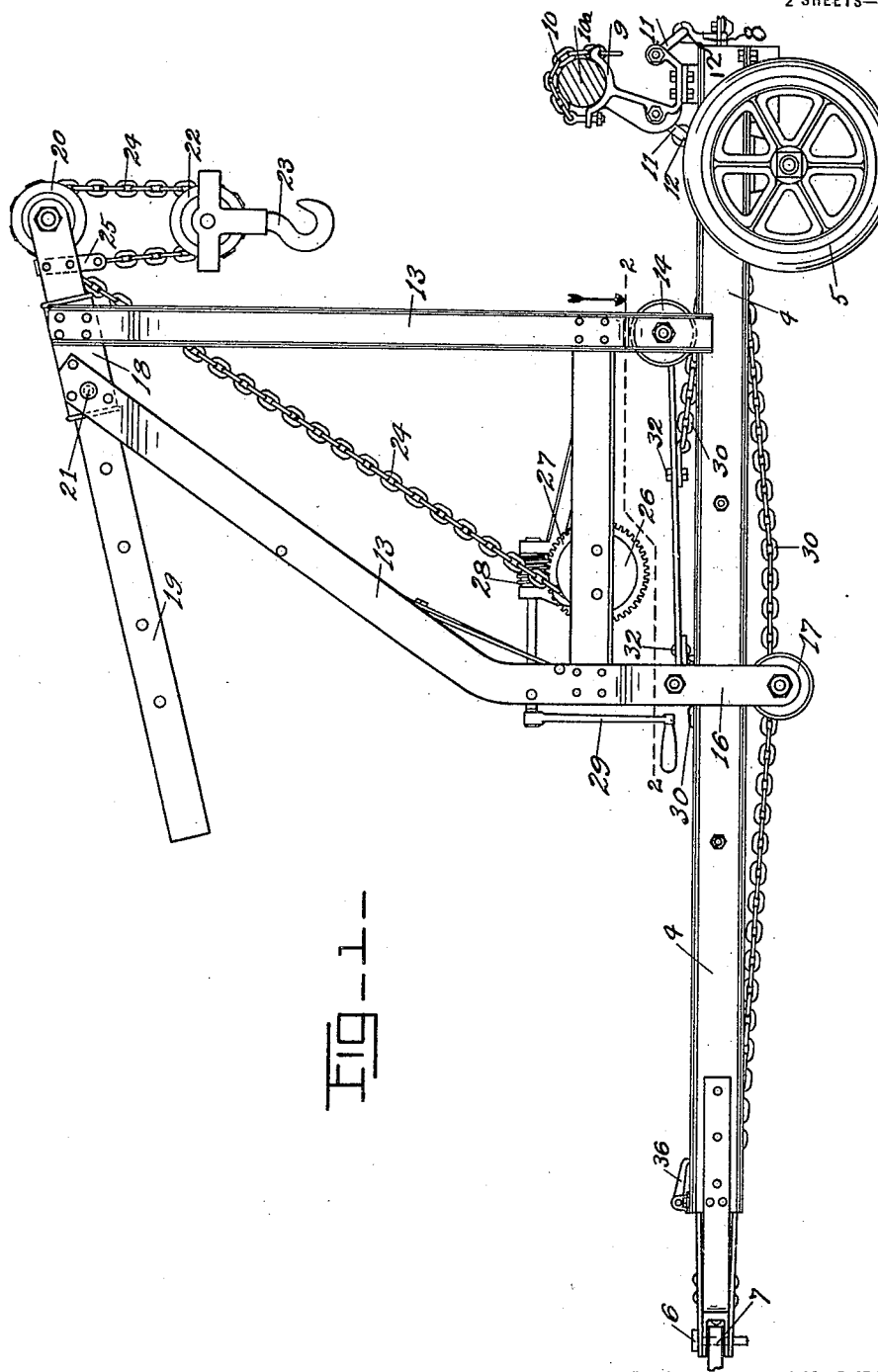
Inventor
LOUIS F. KLOEHN
By A. E. Carleen.
Attorney

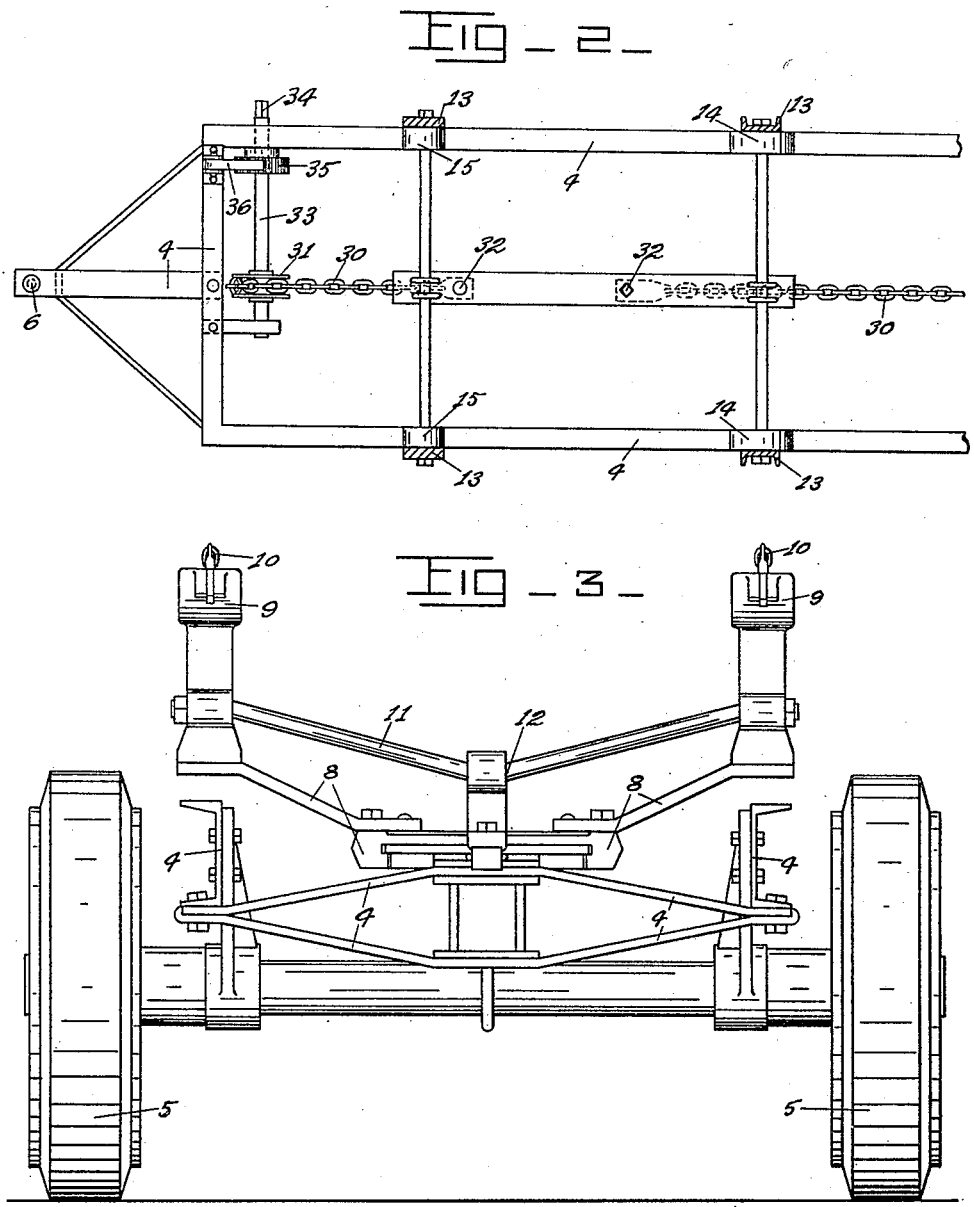

UNITED STATES PATENT OFFICE.

LOUIS F. KLOEHN, OF MINNEAPOLIS, MINNESOTA.

PORTABLE DERRICK.

1,402,074.  Specification of Letters Patent.  Patented Jan. 3, 1922.

Application filed November 15, 1920. Serial No. 424,111.

*To all whom it may concern:*

Be it known that I, LOUIS F. KLOEHN, a citizen of the United States, residing at Minneapolis, in the county of Hennepin and State of Minnesota, have invented certain new and useful Improvements in Portable Derricks, of which the following is a specification.

This invention relates to portable derricks and the main object is to provide a simple, efficient and practical derrick especially adapted for use in transporting crippled automobiles. Further objects will be disclosed in the course of the following specification and in the accompanying drawings, in which:

Fig. 1 is a side elevation of a derrick embodying my invention.

Fig. 2 is a sectional view on the line 2—2 in Figure 1, but showing the carriage in a more forward position on the main frame.

Fig. 3 is an enlarged view of the rear end of the machine, or as seen when looking from the right in Figure 1.

Referring to the drawings by reference numerals, 4 designates a main frame, supported at its rear end by suitable ground wheels 5, and adapted to be pivotally connected at its front end by a bolt 6 to the draw bar 7 of an automobile or truck by which the machine is to be drawn.

A supporting frame 8 is mounted to turn on a vertical pivot on the rear end of the frame 4, and is provided with two saddles 9, in which may be secured by suitable straps or chains 10 either the front or rear axle 10ª of the vehicle to be towed. It may be noted that supporting bars 11 of the frame 8 are bent downwardly and spread at their middle points 12, the object being to allow plenty of room for the differential casing of an automobile when the rear end of the same is being carried.

In order to conveniently lift the crippled end of the automobile up into the saddles 9 I provide a hoisting mechanism which I believe to be not only new and novel but far superior to any other device heretofore designed for accomplishing a similar purpose. A carriage 13, is provided with two sets of rollers 14 and 15 which travel on the side beams of the main frame 4, and extension 16 of the carriage are provided with rollers 17 adapted to engage under the beams and thus prevent the carriage from tipping when a car is being lifted.

At the upper end of the carriage 13 is secured a casing 18 in which is slidably mounted a beam 19 having a pulley 20 in its outer end. A removable pin 21 is adapted to secure the beam 19 in any extended position desired. A second pulley 22, having a hoisting hook 23, is held suspended in a chain 24, one end of which is secured at 25 to the beam 19, and the other end, after passing over the pulley 20, extends down to and is secured about a drum 26 journaled in the carriage 13. A gear 27 is made integral with or is secured to the drum 26, and is driven by a worm 28 which in turn is rotated by a detachable hand crank 29.

A chain 30 passing over pulleys 31, one in each end of the frame 4, has its ends secured to convenient places 32 on the carriage. The front pulley 31 (see Figure 2) is fixed on a shaft 33, which is journaled in the main frame, and which is squared at its end 34 to accommodate the crank 29, or a similar one. The shaft 33 is further provided with a gear or ratchet wheel 35, in the notches of which may engage a pivoted dog 36.

The operation and use of the machine may be described as follows: When either end of an automobile has been wrecked or otherwise damaged beyond temporary repair, and the derrick has been sent for, the wheel end of the machine is backed up against the damaged end of the car. The carriage is then, by means of turning the shaft 33, moved back as far as possible on the main frame, and the hook 23 is let down and secured to the car. By turning the drum 26, with the crank 29, the end of the automobile is then lifted up to the desired height. The crank is then applied to the shaft 33, the dog 36 is released, and the carriage 13 is moved forward until the axle 10ª is brought directly over the saddles 9. The hook 23 is then lowered and released, the chains 10 are secured, and the damaged car is towed away on two of its wheels.

The sliding beam (19) construction makes the machine particularly desirable for use in and around garages. With this arrangement the pulley 20 may be extended far out beyond the end of the machine, thus making it possible to utilize the derrick for such purposes as lifting motors out of and placing them back into motor cars, and for lifting and moving other heavy bodies from place to place. In this connection it may be found desirable to support the front end of the main frame on an auxiliary pair of detachable wheels, but for the present disclosure this is considered unimportant.

It is understood that this specification and the accompanying drawings are purely illustrative of my invention and shall not be interpreted in a limiting sense, but that the invention may also broadly embody suitable modifications in details and general construction, provided, however, that such modifications come within the scope and spirit of the appended claims.

Having now therefore fully shown and described my invention what I claim to be new and desire to protect by Letters Patent is:

1. A machine of the class described, consisting of a suitably supported main frame, a supporting frame mounted to swing on a vertical pivot at one end of the main frame, a carriage adapted to travel longitudinally on the main frame, and a hoisting mechanism mounted in said carriage.

2. A machine of the class described, consisting of a suitably supported main frame, a supporting frame mounted to swing on a vertical pivot at one end of the main frame, a saddle member at each end of said supporting frame, a carriage adapted to travel longitudinally on the main frame, and a hoisting mechanism mounted in said carriage.

3. A machine of the class described, consisting of a suitably supported main frame, a supporting frame mounted to swing on a vertical pivot at one end of the main frame, a saddle member at each end of said supporting frame and means for detachably securing the axle of a motor vehicle therein, a carriage adapted to travel longitudinally on the main frame, and a hoisting mechanism mounted in said carriage.

4. A machine of the class described, consisting of a main frame, ground wheels adapted to support the rear end of the frame and means for securing the front end of the frame to the draw bar of a vehicle, a supporting frame mounted to swing on a vertical pivot at the rear end of the main frame, a carriage adapted to travel on the main frame and means for securing it in various longitudinal positions thereon, and a hoisting mechanism mounted in said carriage for the purpose of lifting the end of a crippled motor car up onto said supporting frame.

In testimony whereof I affix my signature.

LOUIS F. KLOEHN.